(12) United States Patent
Greb et al.

(10) Patent No.: US 12,203,547 B2
(45) Date of Patent: Jan. 21, 2025

(54) HYDRAULIC PARKING LOCK ACTUATOR MODULE

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 80 days.

(21) Appl. No.: 17/924,714

(22) PCT Filed: Apr. 9, 2021

(86) PCT No.: PCT/DE2021/100325
§ 371 (c)(1),
(2) Date: Nov. 11, 2022

(87) PCT Pub. No.: WO2021/228302
PCT Pub. Date: Nov. 18, 2021

(65) Prior Publication Data
US 2023/0193995 A1  Jun. 22, 2023

(30) Foreign Application Priority Data
May 11, 2020 (DE) .......................... 102020112637.9

(51) Int. Cl.
*F16H 63/34* (2006.01)
*F16H 61/02* (2006.01)
*F16H 63/48* (2006.01)

(52) U.S. Cl.
CPC ..... *F16H 63/3483* (2013.01); *F16H 63/3458* (2013.01); *F16H 63/483* (2013.01); *F16H 61/0206* (2013.01); *F16H 63/3433* (2013.01)

(58) Field of Classification Search
CPC ............. F16H 63/3483; F16H 63/3433; F16H 63/3458; F16H 63/3475; F16H 63/483; F16H 61/0206
See application file for complete search history.

(56) References Cited

U.S. PATENT DOCUMENTS

| 2011/0023647 A1* | 2/2011 | Engel | ...................... F16H 61/30 |
| | | | 74/473.11 |
| 2014/0110216 A1* | 4/2014 | Pollack | ............... F16H 63/3483 |
| | | | 192/219.4 |

(Continued)

FOREIGN PATENT DOCUMENTS

| CN | 110966400 A | * | 4/2020 | ......... F16H 63/3483 |
| CN | 110588610 | | 8/2020 | |

(Continued)

*Primary Examiner* — Richard M Lorence
(74) *Attorney, Agent, or Firm* — Volpe Koenig (57) ABSTRACT

A hydraulic parking lock actuation module for a parking lock with a parking lock piston, which can be hydraulically actuated in a parking lock cylinder from an initial position in an actuation direction by applying an actuation pressure, and which is mechanically coupled to an actuation rod which can be fixed via an engaging device in order to act as a locking mechanism for the parking lock piston. In order to simplify the actuation of the parking lock, for actuating the parking lock piston and the locking mechanism for the parking lock piston, the hydraulic parking lock actuation module includes only one active actuation valve with a tank connection and a working pressure connection at which different hydraulic pressure levels are applied.

13 Claims, 4 Drawing Sheets

(56) References Cited

U.S. PATENT DOCUMENTS

2018/0056958 A1    3/2018  Mohlmann et al.
2018/0119816 A1*   5/2018  Gollmer .............. F16H 63/3483

FOREIGN PATENT DOCUMENTS

| DE | 102011105068 | 7/2012 |
| DE | 102016011148 | 3/2017 |
| DE | 102018112670 | 11/2019 |

* cited by examiner

HYDRAULIC PARKING LOCK ACTUATOR MODULE

CROSS-REFERENCE TO RELATED APPLICATIONS

This application is the U.S. National Phase of PCT Appln. No. PCT/DE2021/100325, filed Apr. 9, 2021, which claims the benefit of German Patent Appln. No. 10 2020 112 637.9, filed May 11, 2020, the entire disclosures of which are incorporated by reference herein.

TECHNICAL FIELD

The disclosure relates to a hydraulic parking lock actuation module for a parking lock with a parking lock piston, which can be hydraulically actuated in a parking lock cylinder from an initial position in an actuation direction by applying an actuation pressure, and which is mechanically coupled to an actuation rod which can be fixed via an engaging device in order to act as a locking mechanism for the parking lock piston. The disclosure also relates to a method for operating a parking lock with such a parking lock actuation module.

BACKGROUND

A hydraulic device with a pump is known from the German patent application DE 10 2018 112 670 A1, which device can be connected to a coolant line for supplying a first consumer with hydraulic medium for cooling and/or lubricating it, and to an actuation line for supplying a second consumer, and can be connected to the same hydraulic means to actuate it, wherein the pump is designed as a reversing pump, wherein a hydraulic parking lock actuator, which has a double-acting piston, can be supplied with hydraulic means for actuating the parking lock, wherein the parking lock actuator is able to be fixed in position via a latching device, wherein the locking device has a spring-pretensioned blocking element, which is dimensioned and arranged for engagement in a shape-contrasting recess, wherein the piston is provided with a pull mechanism for emergency unlocking.

SUMMARY

The object of the disclosure is to simplify the actuation of a parking lock with a parking lock piston, which can be hydraulically actuated in a parking lock cylinder from an initial position in an actuation direction by applying an actuation pressure, and which is mechanically coupled to an actuation rod which can be fixed via an engaging device in order to act as a locking mechanism for the parking lock piston.

The object is achieved with a hydraulic parking lock actuation module for a parking lock with a parking lock piston, which can be hydraulically actuated in a parking lock cylinder from an initial position in an actuation direction by applying an actuation pressure, and which is mechanically coupled to an actuation rod which can be fixed via an engaging device in order to act as a locking mechanism for the parking lock piston, in that for actuating the parking lock piston and the locking mechanism for the parking lock piston, the hydraulic parking lock actuation module comprises only one active actuation valve with a tank connection and a working pressure connection, at which different hydraulic pressure levels are applied. The two different hydraulic pressure levels are advantageously provided by a known hydraulic subsystem. With the hydraulic subsystem, for example, a large volumetric flow is provided with a low pressure for cooling and/or lubrication. A low volume flow with a high pressure is provided for the hydraulic actuation of at least one hydraulic actuating element and the parking lock. A hydraulic pump, in particular a tandem pump, which can only deliver in one direction, is preferably used to provide the different hydraulic pressure levels. The use of a reversing pump, which is known from the prior art and can deliver in opposite delivery directions, can thus be dispensed with. With the reversing pump, the hydraulic parking lock actuator known from the German patent application DE 10 2018 112 670 A1, which has a double-acting piston for this purpose, can be actuated in opposite actuating directions. In contrast to this, the parking lock piston with the claimed parking lock actuation module can only be actuated hydraulically in one actuating direction. With the hydraulic parking lock actuation module, the parking lock can be simplified with only one active actuation valve in combination with the different hydraulic pressure levels without sacrificing functionality, but in particular with regard to manufacturing costs. The hydraulic actuation in one actuating direction moves the parking lock piston into an actuation position in which the parking lock is preferably opened, disengaged or deactivated. Such a parking lock is also referred to as a 'normally stay' parking lock, which is opened by hydraulic actuation. 'Normally stay' means that the parking lock remains in its current state. The parking lock piston is designed cost-effectively as a single-acting piston. With regard to the actuation valve, 'active' means that it can be actuated actively; for example, via an electromagnet that is electrically controlled, in order to actively switch the actuation valve from its first to a second switching position.

A preferred exemplary embodiment of the hydraulic parking lock actuation module is characterized in that the hydraulic parking lock actuation module comprises a locking element which can be moved back and forth between a release position and a locking position and which, in its locking position, engages in a latching recess on the actuation rod, wherein the locking element is pretensioned into its locking position by a locking spring. The locking element is, for example, a locking pin that can be moved back and forth, essentially transversely to the actuation rod. The latching recess is, for example, a latching groove into which one end of the locking element, in particular the locking pin, engages in order to lock the actuation rod or the parking lock piston coupled thereto. This provides an effective and inexpensive locking mechanism.

Another preferred exemplary embodiment of the hydraulic parking lock actuation module is characterized in that the locking element is assigned a release piston which can be actuated hydraulically via the actuation valve in a release cylinder against the pretensioning force of the locking spring and which moves the locking element from its locking position into its release position. The actuation valve for the parking lock piston can thus be advantageously used to release or unlock the locking element. Therefore, the release piston can also be referred to as an unlocking piston. The release piston is also designed cost-effectively as a single-acting piston. In this way, the design effort and the manufacturing costs can be further reduced.

Another preferred exemplary embodiment of the hydraulic parking lock actuation module is characterized in that the actuation valve comprises, in addition to the tank connection and the working pressure connection, a parking lock actuation connection and a release connection, to which the different hydraulic pressure levels can be applied via the actuation valve. It is thus advantageously possible to dispense with further valves in the hydraulic parking lock actuation module.

Another preferred exemplary embodiment of the hydraulic parking lock actuation module is characterized in that the actuation valve is designed as a 4/2-way valve. In this way, all desired functions for convenient operation of the parking lock can be implemented with just one active valve. The 4/2-way valve is preferably actuated electrically or electromagnetically and is pretensioned by a spring in one of two positions.

Another preferred exemplary embodiment of the hydraulic parking lock actuation module is characterized in that the locking element is assigned an electrically actuable linear actuator, which is used to move the locking element from its locking position into its release position. The electrically actuable linear actuator is, for example, an electrically actuable lifting magnet. In this way, the locking element can be released or unlocked redundantly either via the electrically actuable linear actuator or by hydraulic actuation of the release piston.

Another preferred exemplary embodiment of the hydraulic parking lock actuation module is characterized in that a return spring is associated with the parking lock piston in order to reset the parking lock piston when the pressure on the parking lock piston in the parking lock cylinder is lowered from a high to a low pressure level via the actuation valve. In combination with the hydraulically actuable release piston or the electrically actuable linear actuator, it is thus ensured that the parking lock can engage when a motor vehicle equipped with the parking lock is parked.

Another preferred exemplary embodiment of the hydraulic parking lock actuation module is characterized in that the actuation rod has two latching recesses in order to lock the parking lock piston in its basic position and in its hydraulically actuated position. As a result, the number of required valve changes can be reduced in certain operating states.

In a method for operating a parking lock with a hydraulic parking lock actuation module as described above, the object specified above is alternatively or additionally achieved in that the parking lock cylinder is connected to the tank connection via the actuation valve, wherein the parking lock piston is held in its basic position by a or the return spring, wherein a or the locking element is held in its locking position by the locking spring. In this way, all desired functions in the operation of the parking lock can be implemented with just one active actuation valve and the two hydraulic pressure levels.

A preferred exemplary embodiment of the method is characterized in that in order to open the parking lock, a or the high pressure level is applied via the actuation valve to a or the parking lock actuation connection. If only one latching recess is used, the actuation rod is released by the locking element, so that no preparation is necessary. When using a second latching groove, the locking element must be released in advance.

The disclosure may also relate to individual parts of the hydraulic parking lock actuation module, such as a parking lock piston, a parking lock cylinder, an actuation rod and/or a locking mechanism, in particular a locking element, and/or an actuation valve. The parts mentioned can be dealt with separately.

BRIEF DESCRIPTION OF THE DRAWINGS

Further advantages, features and details of the disclosure will be apparent from the following description, in which various exemplary embodiments are described in detail with reference to the drawing. In the figures:

FIGS. 5A to 5I show the hydraulic parking lock actuation module from FIG. 1 in various operating states;

DETAILED DESCRIPTION

Figure 1:
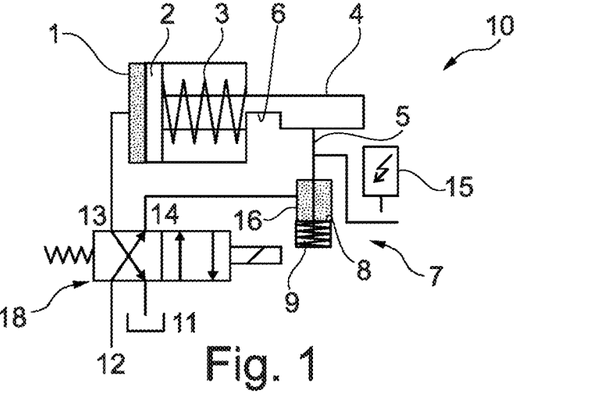
FIG. 1 shows a schematic representation of a hydraulic parking lock actuation module with an actuation valve and a locking mechanism according to a first exemplary embodiment.
Figure 2:
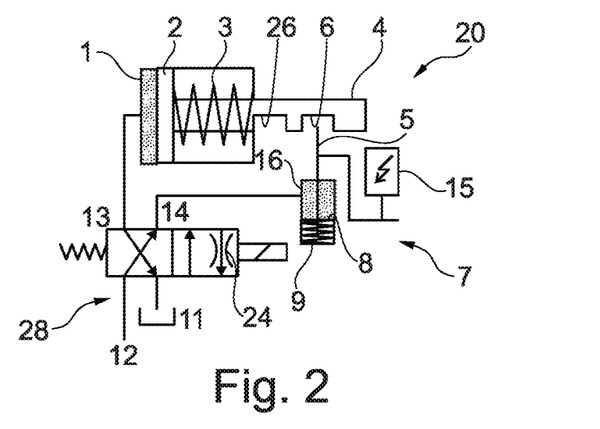
FIG. 2 shows an exemplary embodiment similar to that in FIG. 1 with a slightly modified actuation valve.
Figure 3:
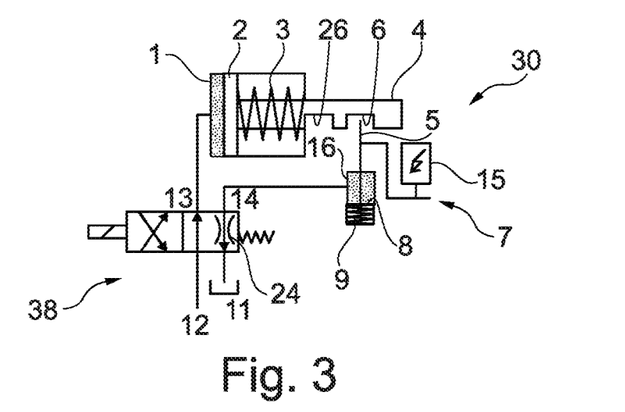
FIG. 3 shows an exemplary embodiment similar to that in FIG. 2 with a reversed actuation valve.

FIGS. 1 to 3 schematically show three embodiment variants of a hydraulic parking lock actuation module 10; 20; 30. The hydraulic parking lock actuation module 10; 20; 30 comprises a parking lock cylinder 1, in which a parking lock piston 2 can be moved back and forth in the horizontal direction in FIGS. 1 to 3. The parking lock piston 2 in the parking lock cylinder 1 is pretensioned by a return spring 3 into its basic position shown in FIGS. 1 to 3.

Figure 6:
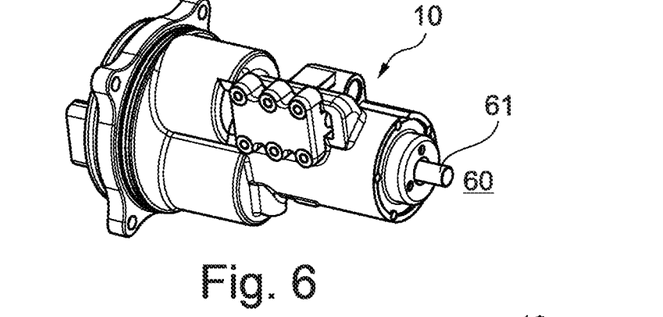
FIG. 6 shows a perspective view of a specific embodiment of the hydraulic parking lock actuation module from FIG. 1.
Figure 7:
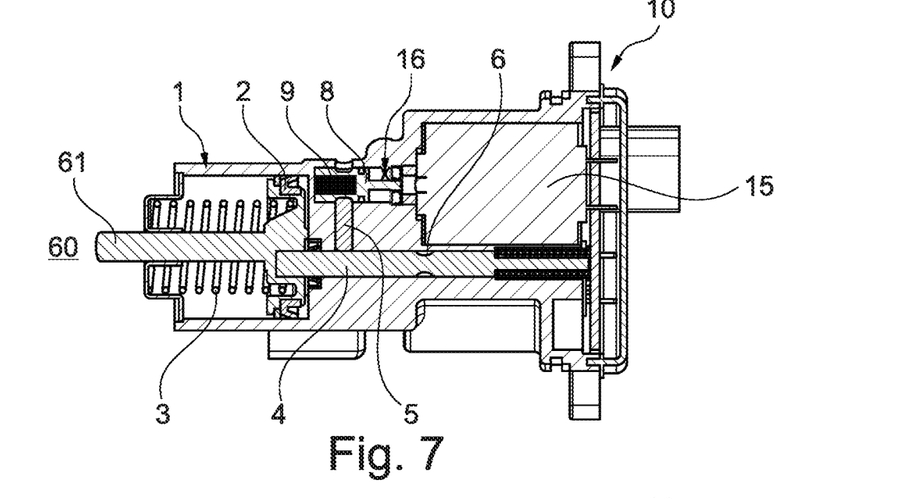
FIG. 7 shows a longitudinal sectional view of the hydraulic parking lock actuation module from FIG. 6.
Figure 8:
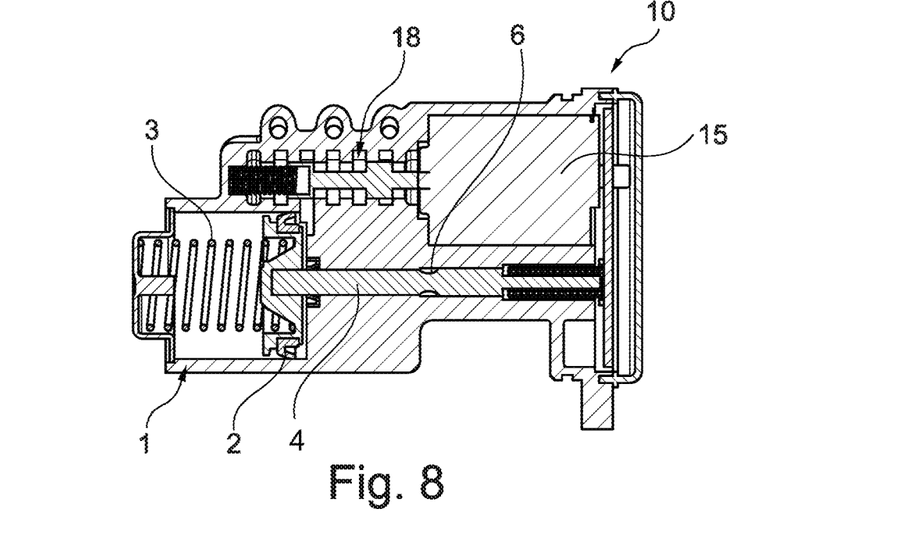
FIG. 8 shows another longitudinal section of the hydraulic parking lock actuation module from FIG. 6.

In FIGS. 6 to 8, a concrete embodiment of the hydraulic parking lock actuation module from FIG. 1 is shown in different views. The same reference symbols are used in FIGS. 1 and 6 to 8 to designate the individual parts.

The hydraulic parking lock actuation module 10; 20; 30 is used to actuate a parking lock, which is only indicated by a reference symbol 60 in FIGS. 6 to 8. The parking lock 60 is actuated, for example, mechanically via a parking lock rod (61 in FIGS. 6 and 7), which interacts with a parking lock mechanism (not shown). Such a parking lock mechanism comprises, for example, a parking lock wheel.

An actuation rod 4 is fastened to the parking lock piston 2. The actuation rod 4 comprises a latching recess 6 into which one end of a locking element 5 engages in a latching manner in order to constitute a locking mechanism 7 for the actuation rod 4.

The locking mechanism 7 comprises a release piston 8 to which the locking element 5 is attached. The release piston 8 is pretensioned upwards by a locking spring 9 in FIGS. 1 to 3. The locking element 5 is pressed in the direction of the latching recess 6 on the actuation rod 4 by the pretensioning force of the locking spring 9. In addition, a linear actuator 15 is assigned to the locking element 5, which is designed, for example, as an electric lifting magnet.

The release piston 8 can be subjected to pressure in a release cylinder 16 on a side facing away from the locking spring 9. The parking lock piston 2 can be subjected to pressure in the parking lock cylinder 1 on a side facing away from the return spring 3. The parking lock piston 2 or the release piston 8 can be subjected to a pressure, which can have different hydraulic pressure levels, via an actuation valve 18 by appropriate pressure application.

The actuation valve 18 is designed as a 4/2-way valve with a tank connection 11, a working connection 12, a parking lock actuation connection 13 and a release connection 14. The actuation valve 18 can be actuated electromagnetically. The actuation valve 18 is pretensioned into its position shown in FIGS. 1 to 3 by a symbolically indicated spring.

The parking lock actuation connection 13 is connected to the parking lock cylinder 1. The release connection 14 is connected to the release cylinder 16. The tank connection 11 is connected to a tank or hydraulic medium reservoir. The working connection 12 can be acted upon with different hydraulic pressure levels via a hydraulic subsystem 40, which is shown in FIG. 4.

Figure 4:
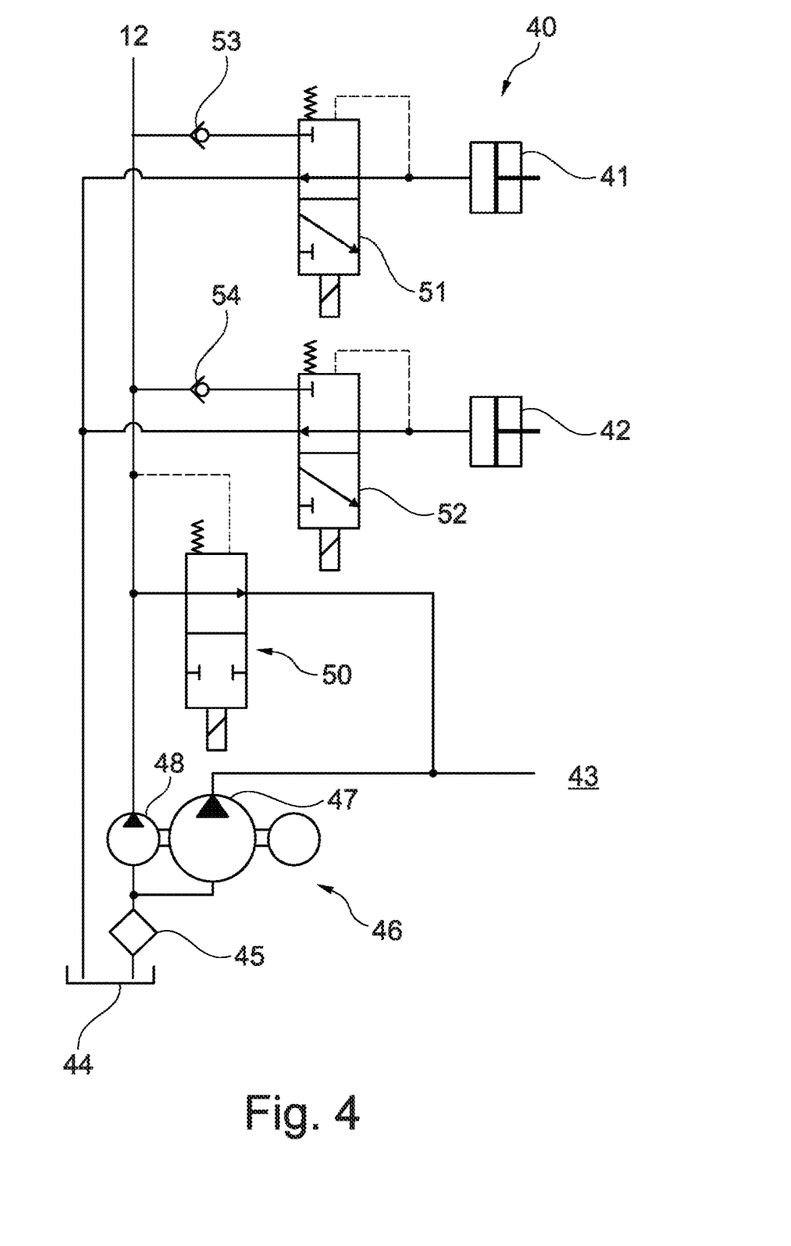
FIG. 4 shows a schematic representation of a hydraulic subsystem for providing two different hydraulic pressure levels for the hydraulic parking lock actuation module in FIGS. 1 to 3.

The hydraulic subsystem 40 shown schematically in FIG. 4 comprises two hydraulic actuation units 41, 42 and a cooling and/or lubricating device 43 with hydraulic medium from a hydraulic medium reservoir 44, which is also referred to as a tank. Hydraulic medium is suctioned in from the hydraulic medium reservoir 44 via a suction filter 45 with a tandem pump 46.

The tandem pump 46 is driven by an electric motor and comprises a first pump 47 and a second pump 48. As indicated symbolically, the two pumps 47 and 48 are both driven by one and the same electric motor. As indicated by a large pump symbol, the pump 47 is designed to provide a large volume flow at a low pressure. The second pump 48 is designed to deliver a small volume flow at high pressure.

As shown in FIG. 4, both pumps 47 and 48 can be used to provide a volume flow for cooling and/or lubrication 43 via a system pressure valve 50. The two hydraulic actuation units 41, 42 can be hydraulically actuated independently of one another with a high pressure, which is provided by the second pump 48, via hydraulic valves 51, 52 in combination with check valves 53, 54. The hydraulic actuation units 41, 42 are, for example, clutches or brakes.

In addition, when the system pressure valve 50 is closed, a high pressure can be provided with the second pump 48 at the working connection 12 for the parking lock. When the system pressure valve 50 is open, a low pressure can also be provided at the working connection 12 of the parking lock. The two hydraulic pressure levels that can be made available at the working connection 12 can advantageously be used via the actuation valve 18 for a comfortable actuation of the parking lock (60 in FIGS. 6 to 8) with the hydraulic parking lock actuation module 10 in FIG. 1.

Figure 5A:
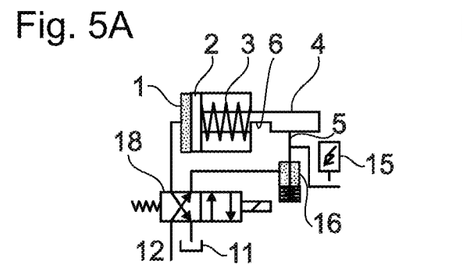

In FIGS. 5A to 5I, different operating states of the hydraulic parking lock actuation module 10 from FIG. 1 are shown. The operating state shown in FIG. 5A shows the parking lock is closed. This operating state corresponds, for example, to a vehicle being stationary with the parking lock engaged. The parking lock cylinder 1 is connected to the tank 11 via the de-energized actuation valve 18, so that the return spring 3 presses the parking lock piston 2 into its basic position shown. The locking element 5, which is also referred to as the locking pin 5, is pressed against the actuation rod 4 by the locking spring 9.

Figure 5B:
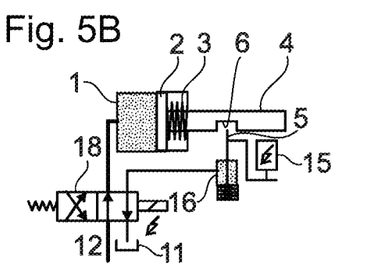

The operating state in FIG. 5B shows the parking lock is open: To open the parking lock, a high pressure level is provided at the working connection 12 of the actuation valve 18 via the hydraulic subsystem (40 in FIG. 4). At the same time, the actuation valve 18 is activated, in particular energized, so that the actuation valve 18 switches and the high pressure level switches to the parking lock cylinder 1, whereby the parking lock piston 2 is moved to the right to disengage the parking lock.

At the end of the actuating path, the locking element 5 latches into the latching recess 6 on the actuation rod 4 due to the pretensioning force of the locking spring 16. If the actuation valve 18 is now switched back to its basic position, or alternatively the pressure level at the working connection 12 is reduced, the locking element 5 keeps the actuation rod 4 open against the force of the return spring 3 and thus the parking lock.

Figure 5C:
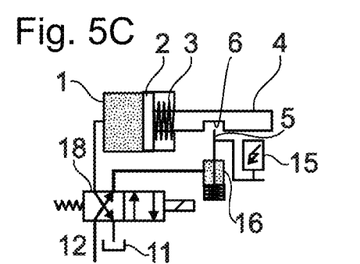

The operating state shown in FIG. 5C corresponds to a cooling mode. In regular driving operation, i.e., without actuating the hydraulic actuation units (41, 42 in FIG. 4), the low pressure level of the active cooling and/or lubrication (43 in FIG. 4) is present at the working connection 12 of the actuation valve 18. For reasons of energy efficiency, the actuation valve 18 can remain de-energized.

The low pressure level of the active cooling and/or lubrication is then applied to the release cylinder 16. The locking spring 9 is advantageously designed to be so strong that the low pressure level is not sufficient to move the locking element 5 out of the latching recess 6. The parking lock thus remains securely open even in cooling mode.

Figure 5D:
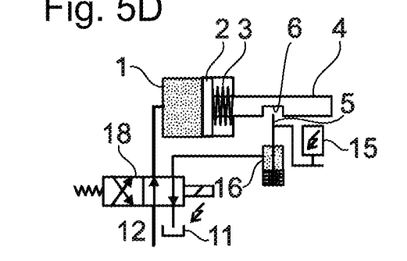

The operating state in FIG. 5D shows preparing the actuation process. If an actuation of a hydraulic actuation unit (41, 42 in FIG. 4) is to take place, a high pressure level is required for this. In the de-energized basic position of the actuation valve 18, this pressure level would pull the locking element 5 out of the latching recess 6, which would result in the parking locks closing in an undesired manner. The actuation valve 18 is therefore switched over shortly before the high system pressure is made available.

Figure 5E:
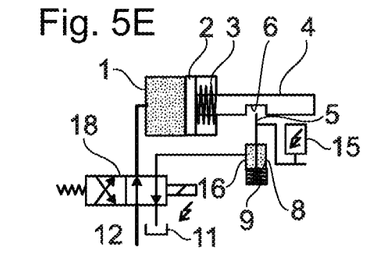

The operating state in FIG. 5E shows actuation. The switchover of the actuation valve 18 is indicated in the operating states shown in FIGS. 5B, 5D, 5E, 5F by a lightning symbol. When the actuation valve 18 is switched over, the high system pressure is present at the parking lock cylinder 1. This does not change the open state of the parking lock. At the same time, the release cylinder 16 is switched to the tank connection 11 so that the actuation rod 4 remains locked.

Figure 5F:
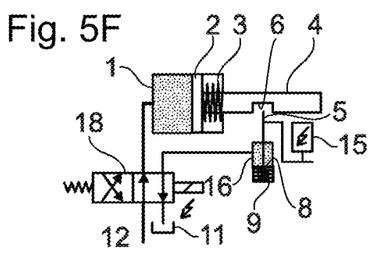

The operating state in FIG. 5F shows post-processing the actuation process. Shortly after the end of the actuation process, when the system pressure provided by the hydraulic subsystem (40 in FIG. 4) has fallen to the low pressure level of the cooling mode, the actuation valve 18 can be de-energized again.

Figure 5G:
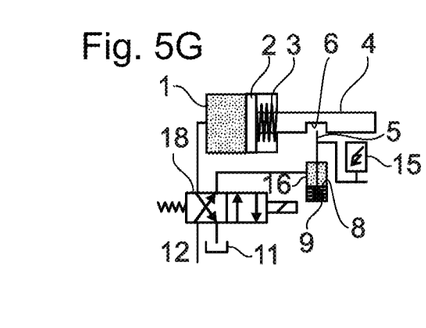

The operating state shown in FIG. 5G again corresponds to the cooling mode, which has already been described with reference to the operating state shown in FIG. 5C.

Figure 5H:
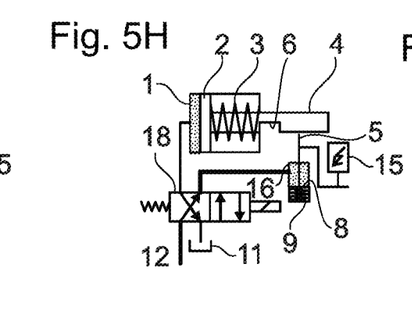

The operating state in FIG. 5H shows engaging the parking lock. If the parking lock is now to be closed to park the vehicle, this can be done either by electrically activating the linear actuator, in particular the lifting magnet, 15 or by applying the high pressure level to the release cylinder 16, so that the locking element 5 is pulled out of the latching recess 6 and as a result the parking lock can close. In the operating states shown in FIGS. 5B, 5E and 5H, the high pressure level is indicated in each case by a thicker line at the working connection 12 of the actuation valve 18.

Figure 5I:
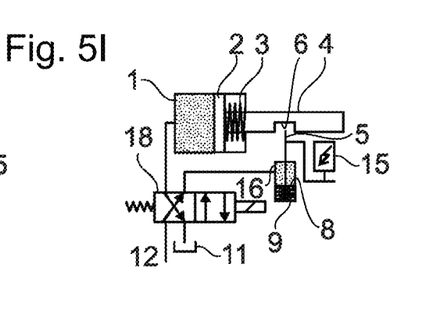

The operating state in FIG. 5I shows the parking lock is open, in particular de-energized. In special operating states; for example, for pushing or towing a motor vehicle equipped with the parking lock, the parking lock can remain in the locked state, as in the cooling mode, even if all systems have been switched off, as the locking element 5 holds the parking lock open both depressurized and de-energized.

In an alternative variant of FIG. 2, a further latching recess 26, in particular a latching groove, is provided on the actuation rod 4 for locking the P position of the parking lock mechanism. Furthermore, the tank return of the release cylinder 16 is preferably damped in the valve, as indicated by a throttle symbol 24 in the valve 28. This ensures that the release piston 8 in the locking spring 9 can only be pushed back slowly.

This makes it possible, in order to open the parking lock, first to pull the locking element 5 out of the latching recess 6 when the actuation valve 18 is not energized by applying high pressure from the hydraulic subsystem (40 in FIG. 4) and then immediately switching over the actuation valve 28 in order to move the parking lock piston 2 with the high pressure and thus open the parking lock. This is possible because the locking element 5 is pushed back only slowly due to the return damping and can no longer engage in the latching recess 6, which has now been shifted. Only when the parking lock cylinder 1 or parking lock piston 2 is fully actuated does the locking element 5 engage in the latching groove 26 for holding the actuation rod 4 in the parking lock open position. All other operating states correspond to the previous description of FIGS. 1 and 5A to 5I.

The variant shown in FIG. 3 comprises an inversely switched actuation valve 38. In the de-energized basic position, the parking lock cylinder 1 is connected to the working connection 12 and the release cylinder 16 is connected to the tank. In the activated, second valve position, the parking lock cylinder 1 is connected to the tank and the release cylinder 9 is connected to the working connection 12.

Like the variant in FIG. 2, this variant also comprises the additional latching groove 26 for locking the parking lock in the closed position. This has the advantage that the actuation valve 18 does not have to be switched beforehand when the working connection 12 is subjected to high pressure in order to actuate one of the hydraulic actuation units (41, 42 in FIG. 4). It can remain in the de-energized basic position. On the one hand, this is energy-efficient and does not require all valves to be controlled simultaneously within the control electronics, since the actuation valve 38 in the hydraulic parking lock actuation module 30 only has to be energized to close the parking lock.

This can take place at times when there is no actuation of the hydraulic actuation units (41, 42 in FIG. 4) and therefore only two valves have to be actuated at the same time. In contrast, in the two variants of FIGS. 1 and 2 described above, the actuation valve 18 within the hydraulic parking lock actuation module 10; 20; 30 must always be energized simultaneously with the system pressure valve (50 in FIG. 4) to provide the high pressure.

However, compared to the variants in FIGS. 1 and 2, the variant in FIG. 3 has the disadvantage that in the event of a power failure, the actuation valve 18 does not connect the parking lock cylinder 1 to the tank but to the working connection 12. The parking lock cylinder 1 will therefore empty more slowly than when it is connected to the tank, which can result in less dynamic closing of the parking lock in the event of a power failure and, in particular, at low temperatures.

LIST OF REFERENCE SYMBOLS

1 Parking lock cylinder
2 Parking lock piston
3 Return spring
4 Actuation rod
5 Locking element
6 Latching recess
7 Locking mechanism
8 Release piston
9 Locking spring
Hydraulic parking lock actuation module
11 Tank connection
12 Working connection
13 Parking lock actuation connection
14 Release connection
15 Electrically actuated linear actuator
16 Release cylinder
18 Actuation valve
Hydraulic parking lock actuation module
24 Throttle symbol
26 Latching recess
28 Actuation valve
30 Hydraulic parking lock actuation module
38 Actuation valve
40 Hydraulic subsystem
41 Hydraulic actuation unit
42 Hydraulic actuation unit
43 Cooling and/or lubrication
44 Hydraulic medium reservoir
45 Suction filter
46 Tandem pump
47 First pump
48 Second pump
50 System pressure valve
51 Hydraulic valve
52 Hydraulic valve
53 Check valve
54 Check valve
60 Parking lock
61 Parking lock rod

The invention claimed is:

1. A hydraulic parking lock actuation module for a parking lock, the actuation module comprising:
 a parking lock piston that is hydraulically actuatable in a parking lock cylinder from an initial position in an actuation direction by applying an actuation pressure, and which is mechanically coupled to an actuation rod that is fixable via an engaging device in order to act as a locking mechanism for the parking lock piston;
 only one active actuation valve for actuating the parking lock piston and the locking mechanism for the parking lock piston, the only one active actuation valve includes a tank connection at a first hydraulic pressure level and a working pressure connection at a second hydraulic pressure level, wherein the first hydraulic pressure level and the second hydraulic pressure level are at different hydraulic pressure levels;
 a return spring positioned within the parking lock cylinder that is configured to act on the parking lock piston in order to reset the parking lock piston when a pressure on the parking lock piston in the parking lock cylinder is lowered from a high pressure level to a lower pressure level via the actuation valve; and
 a locking element that is movable between a release position and a locking position and which, in the locking position, engages in a latching recess on the actuation rod, and a locking spring that biases the locking element into the locking position, wherein the locking element is assigned a release piston located in a release cylinder, the release piston is hydraulically actuatable via the actuation valve against a biasing force of the locking spring and which moves the locking element from the locking position into the release position; and
 wherein a tank return of the release cylinder is damped by a damping mechanism within the actuation valve, which damping mechanism is configured to provide a damping effect on the release piston, preventing sudden movement of the release piston and the locking spring.

2. The hydraulic parking lock actuation module according to claim 1, wherein the actuation valve comprises, in addition to the tank connection and the working pressure connection, a parking lock actuation connection and a release connection, to which the different hydraulic pressure levels are adapted to be applied via the actuation valve.

3. The hydraulic parking lock actuation module according to claim 2, wherein the actuation valve comprises a 4/2-way valve.

4. The hydraulic parking lock actuation module according to claim 2, wherein the locking element is assigned an electrically actuatable linear actuator that is configured to move the locking element from the locking position into the release position.

5. The hydraulic parking lock actuation module according to claim 1, wherein the actuation rod has two latching recesses that are configured to lock the parking lock piston.

6. A method for operating a parking lock with the hydraulic parking lock actuation module according to claim 1, the method comprising:
when the parking lock is closed, connecting the parking lock cylinder to the tank connection via the actuation valve; and
holding the parking lock piston by a return spring, and holding a locking element in a locking position by a locking spring.

7. The method according to claim 6, further comprising in order to open the parking lock, applying a high pressure level via the actuation valve to a parking lock actuation connection.

8. A hydraulic parking lock actuation module for a parking lock, the actuation module comprising:
an actuation rod;
a parking lock piston that is hydraulically actuatable from an initial position in an actuation direction by applying an actuation pressure, the parking lock piston is mechanically coupled to the actuation rod and the actuation rod is fixable via an engaging device to form a locking mechanism for the parking lock piston; and
only one active actuation valve for actuating the parking lock piston and the locking mechanism for the parking lock piston, the only one active actuation valve is a 4/2-way valve which includes a tank connection at a first hydraulic pressure level and a working pressure connection at a second hydraulic pressure level,
wherein the first hydraulic pressure level and the second hydraulic pressure level are at different hydraulic pressure levels, and wherein the hydraulic pressure is provided by a one-way tandem pump.

9. The hydraulic parking lock actuation module according to claim 8, wherein the engaging device includes a locking element that is movable back and forth between a release position and a locking position and which, in the locking position, engages in a latching recess on the actuation rod, and a locking spring that biases the locking element into the locking position.

10. The hydraulic parking lock actuation module according to claim 9, wherein the locking element is connected to a release piston located in a release cylinder, the release piston is hydraulically actuatable via the actuation valve against a biasing force of the locking spring and which moves the locking element from the locking position into the release position.

11. The hydraulic parking lock actuation module according to claim 10, wherein the actuation valve further comprises a parking lock actuation connection and a release connection, to which the different hydraulic pressure levels are adapted to be applied via the actuation valve.

12. The hydraulic parking lock actuation module according to claim 11, wherein the locking element is assigned an electrically actuatable linear actuator that is configured to move the locking element from the locking position into the release position.

13. The hydraulic parking lock actuation module according to claim 11, further comprising a return spring that is configured to act on the parking lock piston in order to reset the parking lock piston when a pressure on the parking lock piston in a parking lock cylinder is lowered from a high pressure level to a lower pressure level via the actuation valve.

* * * * *